(12) United States Patent
Cirello Filho et al.

(10) Patent No.: US 11,546,763 B1
(45) Date of Patent: Jan. 3, 2023

(54) MANAGING AND MONITORING INFRASTRUCTURE ACCESS IN NETWORKED ENVIRONMENTS

(71) Applicant: strongDM, Inc., New York, NY (US)

(72) Inventors: Carlos Ulderico Cirello Filho, Burlingame, CA (US); Justin Allan McCarthy, Redwood City, CA (US); Britt Vandermast Crawford, Bend, OR (US)

(73) Assignee: strongDM, Inc., New York, NY (US)

( * ) Notice: Subject to any disclaimer, the term of this patent is extended or adjusted under 35 U.S.C. 154(b) by 0 days.

(21) Appl. No.: 17/733,735

(22) Filed: Apr. 29, 2022

(51) Int. Cl.
| | |
|---|---|
| *H04W 76/12* | (2018.01) |
| *H04W 12/08* | (2021.01) |
| *H04W 12/06* | (2021.01) |
| *H04W 84/18* | (2009.01) |
| *H04W 24/08* | (2009.01) |

(52) U.S. Cl.
CPC .......... *H04W 12/08* (2013.01); *H04W 12/06* (2013.01); *H04W 24/08* (2013.01); *H04W 76/12* (2018.02); *H04W 84/18* (2013.01)

(58) Field of Classification Search
CPC ..... H04W 12/08; H04W 12/06; H04W 24/08; H04W 76/12; H04W 84/18
See application file for complete search history.

(56) References Cited

U.S. PATENT DOCUMENTS

| | | | |
|---|---|---|---|
| 2018/0123957 A1* | 5/2018 | Chen | ........................ H04L 45/26 |
| 2021/0168661 A1* | 6/2021 | Wong | ..................... H04L 63/123 |

\* cited by examiner

*Primary Examiner* — Said M Elnoubi
(74) *Attorney, Agent, or Firm* — John W. Branch; Branch Partners PLLC

(57) ABSTRACT

Embodiments are directed to managing access to network resources. Mesh agents for an overlay network may be provided. If a client requests access to a resource, a first mesh agent configured to provide the client with ingress to the overlay network may be determined. If a security engine validates the request received from the first mesh agent, a route from the client to the resource may be determined. A secure tunnel may be generated between the first mesh agent and a last mesh agent based on forwarding the request to mesh agents on the route. If the request is provided to the last mesh agent credential information for the resource may be provided to the last mesh agent and the last mesh agent, the request and the credential information may be employed to access the resource.

26 Claims, 13 Drawing Sheets

MANAGING AND MONITORING INFRASTRUCTURE ACCESS IN NETWORKED ENVIRONMENTS

TECHNICAL FIELD

The present invention relates generally to network security, and more particularly, but not exclusively, to managing and monitoring infrastructure access in networked environments.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, regulatory environment has been adapting to the increase in computer-based services. Accordingly, organizations may be required to comply with regulatory regimes from multiple jurisdictions related to various critical subjects, such as, finance, privacy, employee rights, cross jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
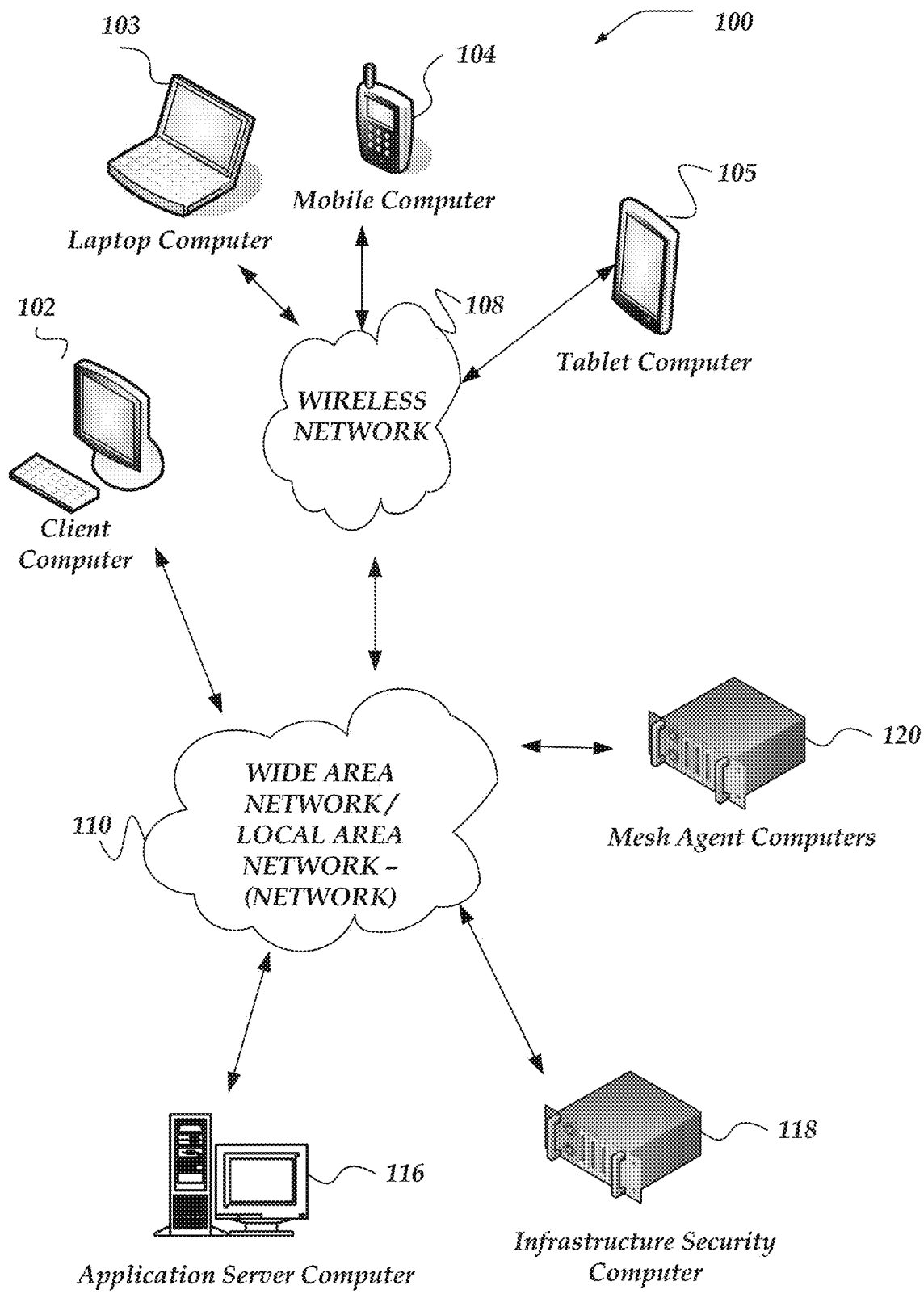
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time, and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing access to network resources in a network. In one or more of the various embodiments, a plurality of mesh agents for an overlay network may be provided such that each mesh agent may be hosted on one or more network computers in the overlay network.

In one or more of the various embodiments, in response to a request from a client to access a resource on the network, a first mesh agent configured to provide the client with ingress to the overlay network may be determined.

In one or more of the various embodiments, in response to a security engine validating the request received from the first mesh agent, a route in the overlay network from the client to the resource may be determined such that each portion of the route may correspond to one or more other mesh agents and such that a last mesh agent in the route may be enabled to provide access to the resource.

In one or more of the various embodiments, a secure tunnel may be generated between the first mesh agent and the last mesh agent based on forwarding the request to one or more mesh agents on the route in the overlay network such that the request may be validated at each mesh agent in the route by the security engine.

In one or more of the various embodiments, in response to providing the request to the last mesh agent further actions may be performed, including: providing credential information for the resource to the last mesh agent; employing the last mesh agent, the request and the credential information to access the resource, wherein the last mesh agent obtains a response to the request from the resource; providing the response to the client via the secure tunnel; or the like.

In one or more of the various embodiments, generating the secure tunnel may include: providing each mesh agent associated with the route a list of one or more candidate mesh agents that each enable access to a next portion of the route such that the list is arranged based on one or more characteristics of the one or more candidate mesh agents; determining a next mesh agent in the route based on the list of one or more candidate mesh agents; forwarding the request to the next mesh agent; or the like.

In one or more of the various embodiments, the last mesh agent may be employed to generate activity information based on the request and the response from the server. In some embodiments, an authenticity token may be generated based on the activity information. In some embodiments, the authenticity token may be provided to the security engine; storing the activity information in one or more data stores that may be separate from the security engine; or the like.

In one or more of the various embodiments, validating the request at each mesh agent in the route may include: employing the request to determine one or more access rules and a user associated with the resource; validating the request based on the one or more access rules and the user such that the request may be forwarded to one of another mesh agent in the route or the resource.

In one or more of the various embodiments, the secure tunnel may be periodically validated. In some embodiments, in response to the secure tunnel failing a periodic validation, further actions may be performed including: disabling the client from accessing the resource; discarding the secure tunnel; or the like.

In one or more of the various embodiments, one or more performance metrics associated with the plurality of mesh agents may be monitored. And, in some embodiments, the route may be modified based on the one or more performance metrics.

In one or more of the various embodiments, in response to the last mesh agent receiving an error message from the resource, further actions may be performed, including: modifying the error message to exclude sensitive information; providing the modified error message to the client via the secure tunnel; or the like.

In one or more of the various embodiments, each mesh agent may be configurable to operate as an ingress agent or an egress agent.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, application server computer 116, infrastructure security computer 118, one or more mesh agent computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by network monitor computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
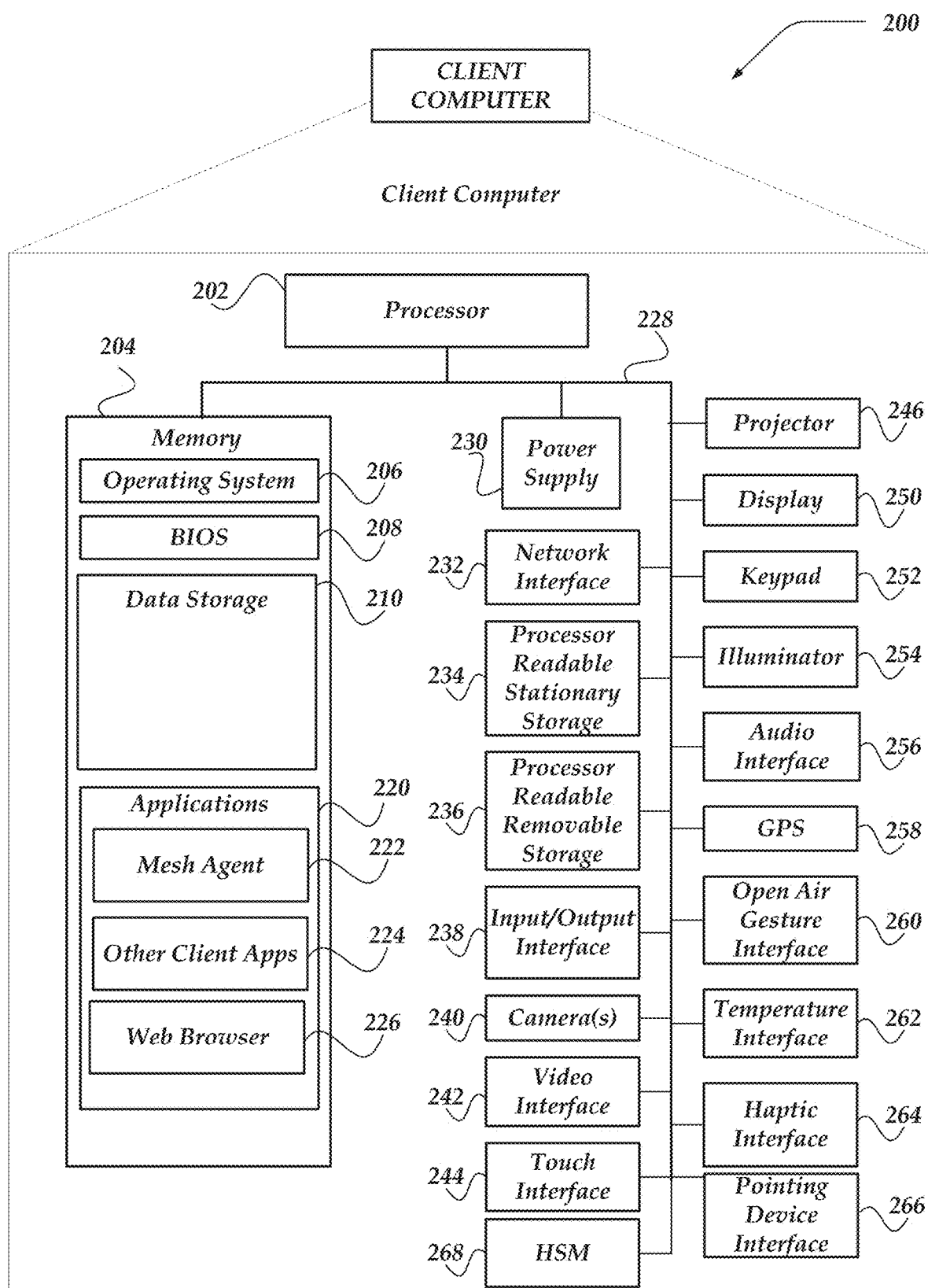
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, mesh agent 222, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
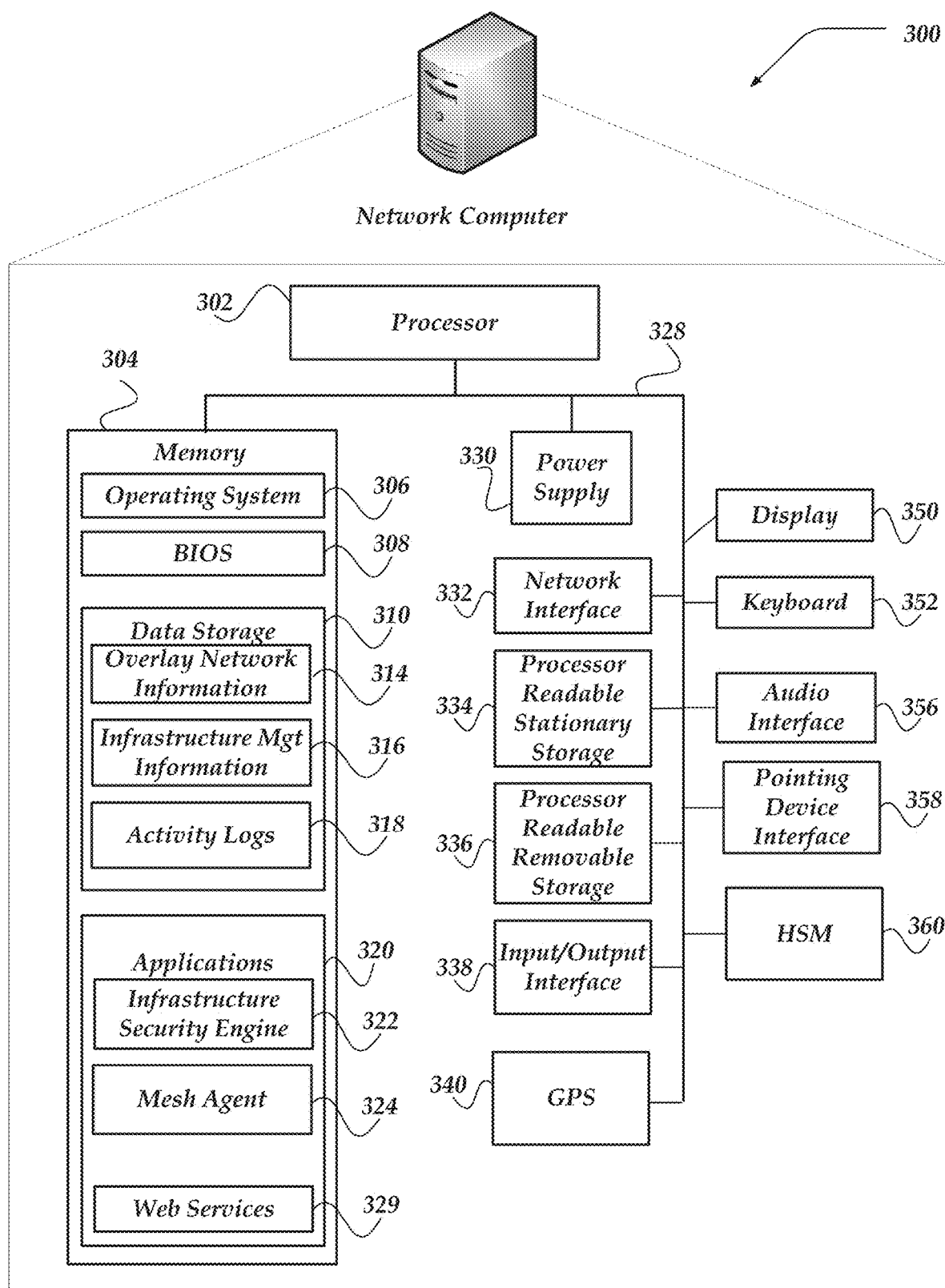
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, overlay network engine 322, mesh agent 324, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 314, infrastructure management information 316, activity logs 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include overlay infrastructure security engine 322, mesh agent 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, infrastructure security engine 322, mesh agent 324, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to infrastructure security engine 322, mesh agent 324, web services 329, or the like, may be provisioned and de-commissioned automatically.

Also, in one or more of the various embodiments, infrastructure security engine 322, mesh agent 324, web services 329, or the like, may be located in virtual servers running in a cloud-based computing environment rather than being tied to one or more specific physical network computers. Likewise, in some embodiments, one or more of infrastructure security engine 322, mesh agent 324, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
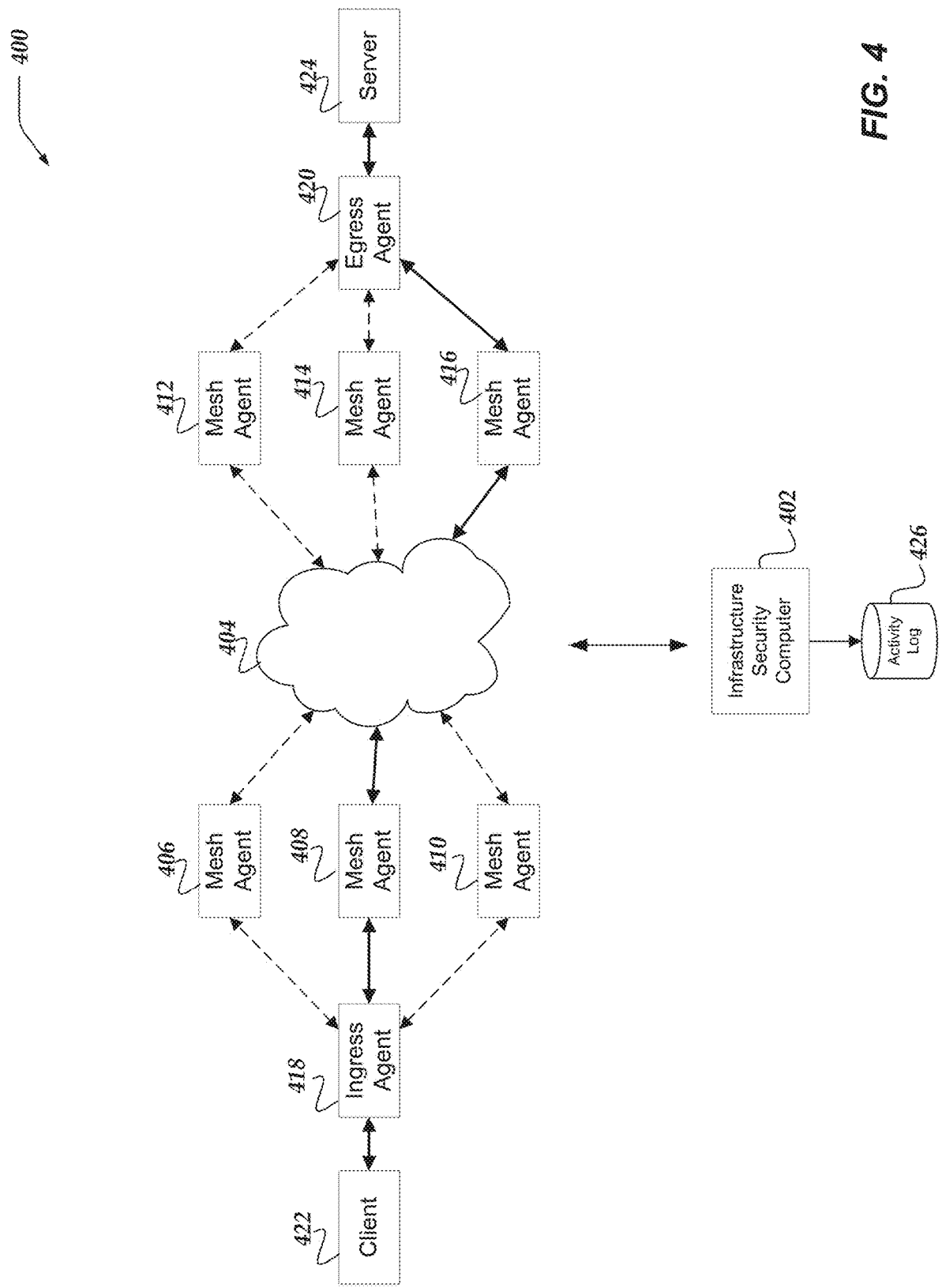
FIG. 4 illustrates a logical architecture of a system for managing and monitoring infrastructure access in networked environments in accordance with one or more of the various embodiments.

FIG. 4 illustrates a logical architecture of system 400 for managing and monitoring infrastructure access in networked environments in accordance with one or more of the various embodiments. In some embodiments, system 400 may comprise: one or more infrastructure security computers, such as, infrastructure security computer 402; one or more networks, such as, network 404; one or more mesh agents, such as, mesh agents 406-410 or mesh agents 412-416; one or more edge agents, such as, ingress agent 418 or egress agent 420; one or more clients, such as, client 422 or client 424; one or more activity log data stores, such as, activity log 426; or the like.

In one or more of the various embodiments, mesh agents may be arranged to provide a soft-defined overlay network that runs on one or more conventionally configured/provisioned physical (underlay) networks. In some embodiments, if a client application attempts to access resources managed by an infrastructure security service, the mesh agent used by clients to gain access to resources in a managed environment may be considered an ingress agents. Similarly, mesh agents that enable resource servers to respond to client request via the overlay network may be considered to be egress agents. Accordingly, in some cases mesh agents may be ingress agents in some contexts and they may be egress agents in other contexts. The different nomenclature is used herein as a convenience when described features of embodiments in the different contexts.

In one or more of the various embodiments, infrastructure security computers, such as, infrastructure security computer 402, may host one or more infrastructure security engines that enforce a secure overlay network that provides managed access to one or more resources (or endpoints) in an networked environment.

In one or more of the various embodiments, if a client employs an mesh agent, such as, ingress agent 418, the ingress agent may be arranged communicate with infrastructure security computer 402 to authenticate the client request and determine a network path from the client to the target resource server via the overlay network.

In one or more of the various embodiments, mesh agents may be arranged to determine a next 'hop' to a next mesh agent. Accordingly, the next mesh agent, as well as, other mesh agents, may determine the next hop to a next mesh agent. Eventually, in some embodiments, the communication or request may reach an egress agent for the target resource server. And, in some embodiments, if each intervening mesh agent validates or authenticates the client communication, the client communication may reach the intended target resource server.

In one or more of the various embodiments, if an ingress agent receives a client request, the ingress agent may send a communication to an infrastructure security computer, such as, infrastructure security computer 402 to determine one or more authorized routes through the overlay network to reach the target resource server. In some embodiments, routes through the overlay network may be considered to be overlay paths that go from mesh agent-to-mesh agent until the target server may be reached.

In one or more of the various embodiments, mesh agents may establish a cryptographically secure virtual network tunnel between clients and servers such that the client/server traffic may be opaque to observers or other network devices that may be unaffiliated with the infrastructure security computer.

Note, one of ordinary skill in the art will appreciate that system 400 may comprise one or more network devices, network computers, routers, switches, or the like, that comprise the underlay network. For brevity and clarity, the underlay network components are omitted from FIG. 4.

In one or more of the various embodiments, mesh agents may be considered to be hosted on physical or virtual network computers that have access to the underlay networks. Also, in some embodiments, the number of overlay network hops (between/via mesh agents) between endpoints may be different than the actual network hops required by the underlay network. For example, for some embodiments, system 400 shows one overlay hop to get from ingress agent 418 to mesh agent 408. However, in some cases, there may be multiple hops in the underlay network to communicate network traffic between ingress agent 418 and mesh agent 408. For example, in some embodiments, one hop in the overlay network may traverse one or more sub-networks that may require multiple hops through multiple underlay network routers.

In one or more of the various embodiments, if a client provides a request to communicate with a managed endpoint (e.g., resource server 424), the corresponding ingress agent (e.g., ingress agent 418) forwards information about the request to an infrastructure security computer (e.g., infrastructure security computer 402). Accordingly, in some embodiments, an infrastructure security engine (hosted on the infrastructure security computer) may be arranged to determine if the client user has permission to communicate with the target endpoint. Also, in some embodiments, the infrastructure security engine may be arranged to determine one or more next mesh agents where the ingress agent may forward the client request. Accordingly, in some embodiments, infrastructure security engines may be arranged to generate a overlay route table that includes one or more available mesh agents that may be candidates that may be suitable and authorized for handling the communication.

In some embodiments, as client the communication may be forwarded to subsequent mesh agents, each intervening mesh agent may be arranged to validate and authenticate the client communication using the infrastructure security engine. In some embodiments, if the client communication may be authorized, the infrastructure security engine may provide an overlay route table that identifies one or more mesh agents for the next hop through the overlay network.

In this example, the overlay path determined for client 422 to communicate with server 424 is ingress client 418 to mesh agent 408 to mesh agent 416 to egress agent 420 and ultimately to server 424. At the final mesh agent (e.g., egress agent 420), the egress agent may determine/obtain the credentials that enable access to the server. In some embodiments, egress agents may be arranged to communicate with an infrastructure security computer to obtain credentials for a server. In this example, the connections (double-arrow lines) illustrated with solid lines represent the determined route through the overlay network. In contrast, the connections (double-arrow lines) illustrated using dashed lines represent mesh agents that may be part of the overlay network but not selected for a particular communication between client 422 and server 424.

In one or more of the various embodiments, ingress agents, egress agents, or mesh agents may be configured to capture or record activity that may associated with the communication through the secure tunnel. In this example, for some embodiments, activity log data store 426 represents a data store for storing logged or recorded activity for a managed infrastructure. In some embodiments, infrastructure security engines may be arranged to enable different types of activity logging. In some embodiments, infrastructure security engines may be configured to record one or more of the user information associated with an action, occurrence of actions, the accompanying application payload (if any), response from servers, or the like. Further, in some embodiments, infrastructure security engines may enable log information to be forwarded to another data store for storage or archival.

In one or more of the various embodiments, infrastructure security engines may be arranged to generate authenticity tokens that may act as a fingerprint for activity that may occur during the secure tunnel session. In one or more of the various embodiments, authenticity tokens may be generated based on the payload content, user identities, client identities, or the like, that may be associated with an overlay session. For example, if the secure tunnel session includes a response to a query, the authenticity token may be generated based on a hash of the response to the query. Among other things, in some embodiments, authenticity tokens may be employed as part of a scheme to determine the authenticity activity log information that may be stored elsewhere.

Figure 5:
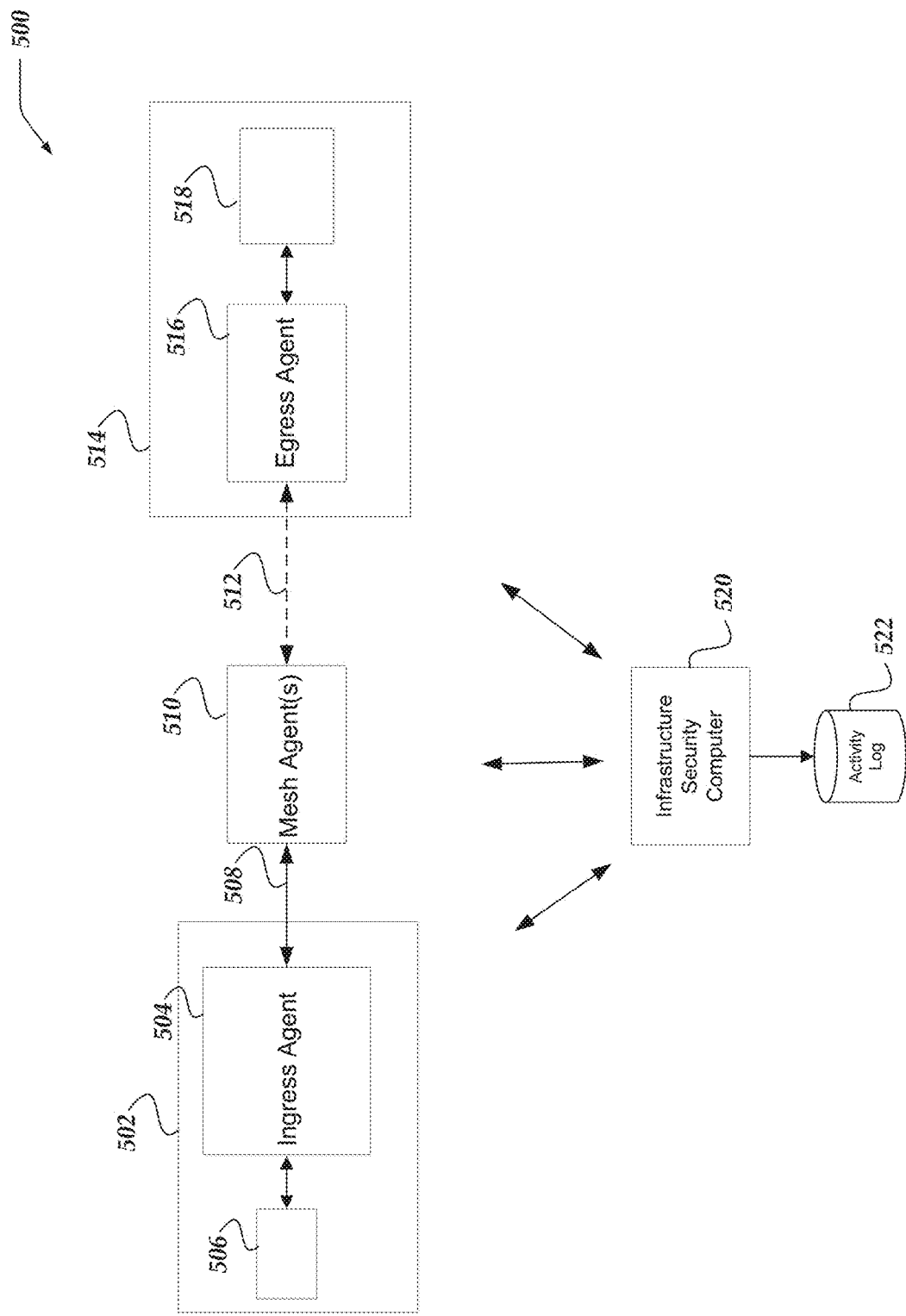
FIG. 5 illustrates a logical schematic of a system for managing and monitoring infrastructure access in networked environments in accordance with one or more of the various embodiments.

FIG. 5 illustrates a logical schematic of system 500 for managing and monitoring infrastructure access in networked environments in accordance with one or more of the various embodiments. in this example, for some embodiments, system 500 includes client computer 502, ingress agent 504, client application 506, mesh agent(s) 510, target resource computer 514, egress agent 516, server 518, infrastructure security computer 520, activity log data store 522. Note, in some embodiments, ingress agents may be considered mesh agents that a client application employs to communicate via an overlay network. Similarly, in some embodiments, egress agents may be considered mesh agents that communicate with server applications. Note, as mentioned above, ingress agents and egress agents may be considered mesh agents that may provide ingress or egress of traffic in the overlay network. Thus, for brevity and clarity mesh agents may be referred to as ingress agents, egress agents, or mesh agents depending on their immediate role in an overlay communication session.

In this example, for some embodiments, network path 508 may represent communication over a single overlay network hop of a secure tunnel that may comprise one or more underlay network hops to reach the computer that is hosting mesh agent 510. Likewise, network path 512 may represent one or more overlay network hops (intervening mesh agents not shown) that reach target computer 514 and egress agent 516.

As described above, in some embodiments, mesh agents may be arranged to communicate with infrastructure security engines that may be hosted on infrastructure security computers, such as, infrastructure security computer 520. Also, in some embodiments, infrastructure security engines may be arranged to log overlay session activity into activity log data store 522.

Figure 6:
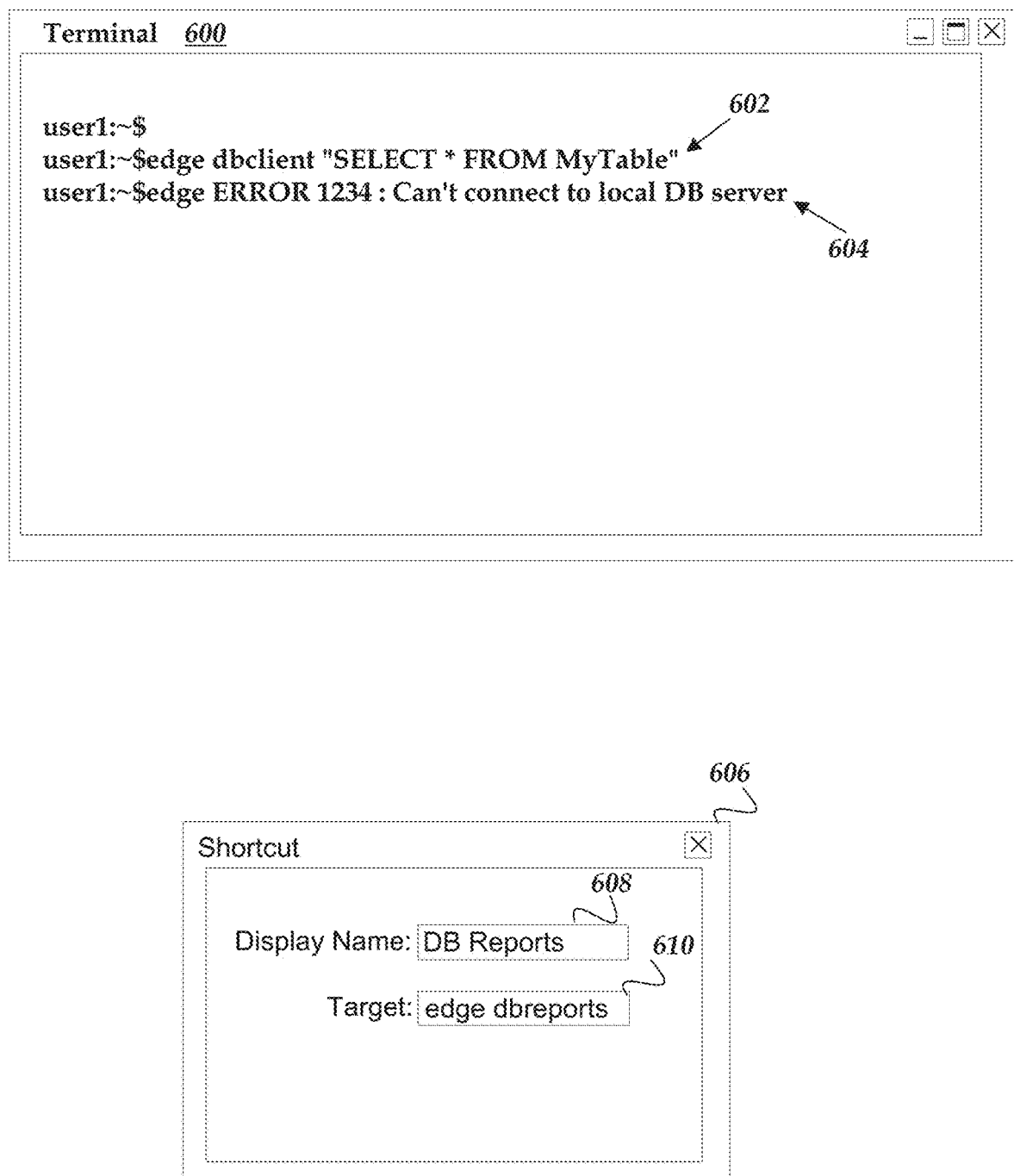
FIG. 6 illustrates logical schematic of a terminal and a shortcut for enabling client applications to access an overlay network in accordance with one or more of the various embodiments.

FIG. 6 illustrates logical schematic of terminal 600 and shortcut 606 for enabling client applications to access an overlay network in accordance with one or more of the various embodiments. In some embodiments, terminal 600 may represent a computer terminal application that enables users access to command-line interfaces for various applications. In this example, for some embodiments, command line 602 represents a command line that may be provided by a user. In this example, the user is attempting to retrieve data from a remote database using the program dbclient. In the example, the command 'dbclient' is shown as prefixed by the command 'edge'. Accordingly, in this example, the prefix represents a command to employ an ingress agent to execute the dbclient. Accordingly, in this example, rather than routing the dbclient command via the conventional underlay network, the ingress agent may capture the execution of dbclient and employ the overlay network to establish a secure tunnel for the requested operation.

Similarly, in some embodiments, shorcut 606 illustrates how a shortcut for a GUI based operating system or window manager may be configured to route commands initiated from a desktop (e.g., mouse-clicks) through secure tunnels in the overlay network. In this example, shortcut 606 includes an application display name, such as, display name 608 and a launch/execution command represented by target 610. Thus, in this example, shortcuts may be configured to enable launched applications to access the overlay network.

Note, often client applications may support users providing server identifiers (e.g., URIs, IP addresses, hostnames, or the like) that declare the server that for the client application. For example, a conventional command to launch a dbclient application may include the hostname where the database server of interest is located. However, for resources in the overlay network, the infrastructure security engines may determine the location of the server.

Figure 7:
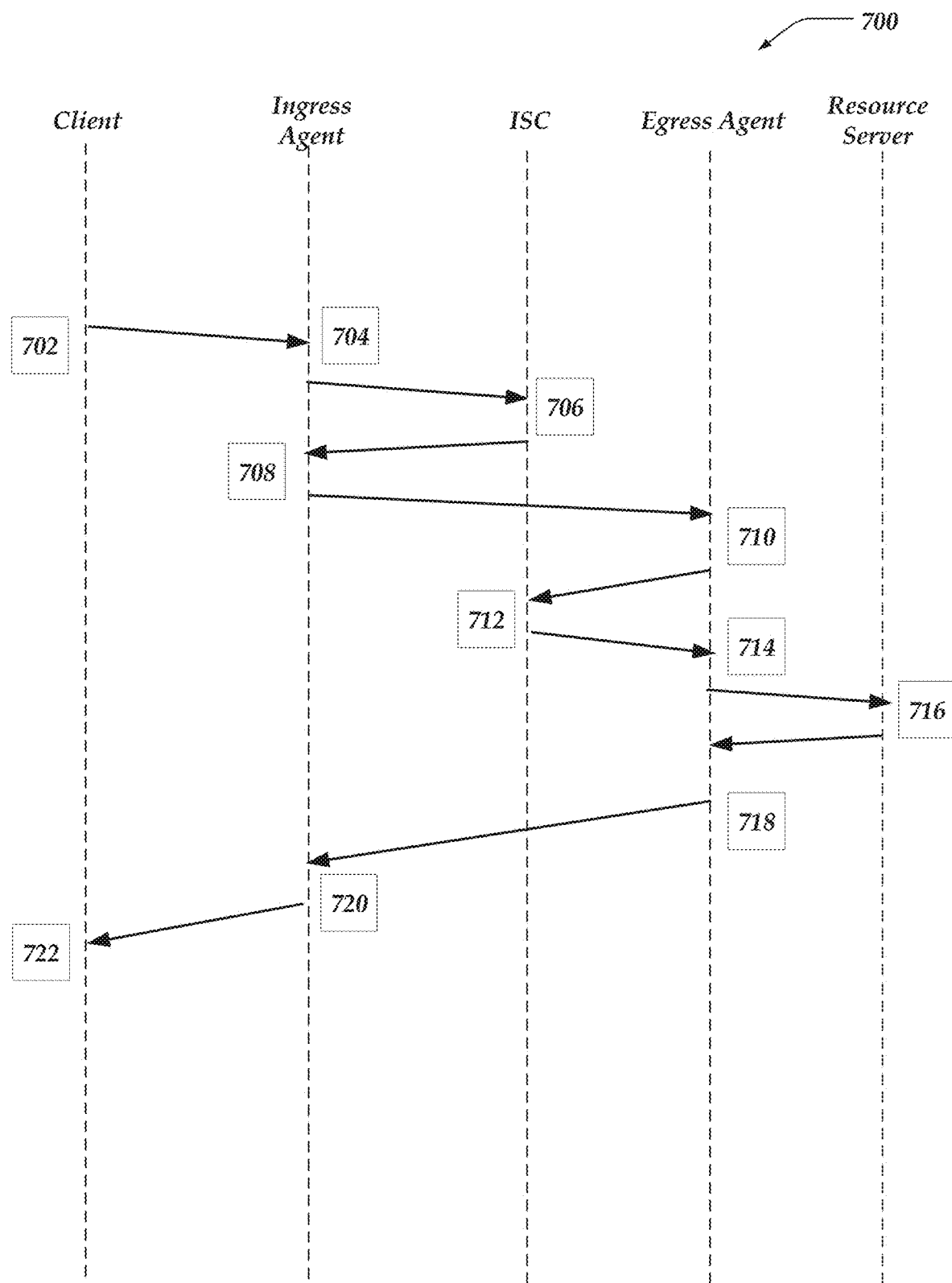
FIG. 7 illustrates a logical diagram of a sequence for managing and monitoring infrastructure access in networked environments in accordance with one or more of the various embodiments.

FIG. 7 illustrates a logical diagram of sequence 700 for managing and monitoring infrastructure access in networked environments in accordance with one or more of the various embodiments.

In one or more of the various embodiments, sequence 700 illustrates interactions between or among clients, servers, ingress agents, egress agents, infrastructure security engines, or the like. As described above, in some embodiments, ingress agents and egress agents may be mesh agents that are providing access to the overlay network for clients or services. Similarly, clients may be resources that are initiating a request directed to another resource and servers may be resources that may respond to a client request. Accordingly, resources may be clients or servers depending on their role at a particular moment.

At step 702, in one or more of the various embodiments, a client service may provide a request to access a managed resource or service. (Services or resources may hereinafter be referred to collectively as resources.) Also, resources that a client may be attempting to communicate with may be referred to as target resources.

As described above, managed resources may be accessible via mesh agents. Accordingly, in some embodiments, the mesh agent associated with the client may be considered the ingress agent that enables the client to gain access to the overlay network.

At step 704, in one or more of the various embodiments, the ingress agent associated with the client may communicate with an infrastructure security computer that may be hosting one or more infrastructure security engines. In one or more of the various embodiments, this communication may include an authorization request to determine if the client may be enabled to reach the target resource via the overlay network.

At step 706, in one or more of the various embodiments, the infrastructure security computer may respond to the authentication request. In one or more of the various embodiments, if the client may be enabled to access the server, the infrastructure security computer may respond with the approval and a table of one or more routes to one or more mesh agents in the overlay network. In contrast, in some embodiments, if the client may be disabled from accessing the server, the infrastructure security computer may decline the approval request.

At step 708, in one or more of the various embodiments, if the request to access the server may be approved by the infrastructure security computer, the ingress agent may forward the client request to a next mesh agent as determined from route information from the route table that was provided by the infrastructure security computer.

Note, in this example, sequence 700 shows a ingress agent for the client communicating directly with the egress agent for the resource server. In practice, there may be zero or more intervening mesh agents depending on the configuration of the overlay network. However, for brevity and clarity intervening mesh agents are omitted from sequence 700. In some embodiments, each intervening mesh agent, if any, may be arranged to communicate with the infrastructure security computer to confirm if a client can reach the intended server and obtain next hop information similar as described for the ingress agent.

At step 710, in one or more of the various embodiments, the client request may be provided to the egress agent. Accordingly, in some embodiments, similar to other mesh agents participating in the connection/session, the egress agent may confirm that the client is authorized to access the target resource.

Also, in one or more of the various embodiments, the egress agent may request the user credentials for accessing the resource. In some embodiments, in some embodiments, the particular credentials or the form of the credentials may be determined based on the type of resource or server being accessed. For example, some servers may support/require cryptographic certificates while other servers may require a username and password. In some embodiments, egress agent may be arranged to obtain the user credentials from the infrastructure security computer.

At step 712, in one or more of the various embodiments, the infrastructure security computer may determine if the client can access the resource server. Also, in some embodiments, since this request is coming from the egress agent, the infrastructure security computer may be arranged to provide login credentials (if any) for the resource server. For example, in some embodiments, if a username and password may be required to respond to the client request, the infrastructure security computer may provide a username and password to the egress agent.

At step 714, in one or more of the various embodiments, if the infrastructure security computer authenticates the user, the infrastructure security computer may provide user credentials to the egress agent. Accordingly, in some embodiments, the egress agent may forward the client request with the user credentials to the resource server.

At step 716, in one or more of the various embodiments, the resource server may receive the client request with credentials provided from the egress agent. Accordingly, in some embodiments, the resource server may process the client request. In one or more of the various embodiments, if the resource server provides a response, the response may be forwarded to the egress agent.

At step 718, in one or more of the various embodiments, the egress agent may be arranged to forward the resource server response back through a secure tunnel in the overlay network towards the ingress agent that corresponds to the client. In some embodiments, the resource server response may be forwarded through one or more intervening mesh agents that were determined to establish the secure tunnel between the egress agent and the ingress agent rather than validating the resource server response with the infrastructure security computer at each mesh agent.

Accordingly, in one or more of the various embodiments, mesh agents may be arranged to employ the secure tunnel for the session without validating the client or secure tunnel with the infrastructure security computer based on the validation/authentication performed to establish the secure tunnel.

Also, In one or more of the various embodiments, mesh agents may be configured to periodically confirm or validate that the secure tunnel remains valid. In some embodiments, infrastructure security engines may be arranged to configure different on-going validation policies for different resources, sub-networks, clients, applications, or the like. For example, a default policy may require mesh agents to check if sessions remain valid every 60 seconds while sessions associated with sensitive resources may be configured check if sessions remain valid every 15 seconds.

Further, in some embodiments, infrastructure security computers may be arranged to proactively share policy updates with one or more mesh agents. Accordingly, in some embodiments, an updated policy may result in an existing secure session tunnel being invalidated. For example, in some embodiments, if a user associated with an active secure tunnel may be disqualified for one or more reasons, the mesh agents may terminate the secure tunnel and refrain from forwarding traffic between the ingress agent and egress agent. Note, as described herein, ingress agents and egress agents may be considered mesh agents. Accordingly, in some embodiments, updates to policies, periodic validity checks, or the like, may be performed by ingress agents and egress agent because they are both mesh agents.

In one or more of the various embodiments, egress agents may be arranged to generate activity information associated with the communication that may occur between the client and resource server. In some embodiments, egress agents may be configured to generate different amounts of activity information that may be log or stored differently. Accordingly, in some embodiments, activity information may be one or more of transport protocol packet captures, application protocol captures, one or more application metrics, one or more session/communication metrics, abbreviated summaries, or the like.

Also, in some embodiments, egress agents may be arranged to generate a authenticity tokens based on fingerprint values that may be based on the activity information that corresponds to client/server communication. For example, in some embodiments, mesh agents may be arranged to generate a digest based on hashing the payloads associated client requests or server responses. In some embodiments, mesh agents may be arranged to generate fingerprint information that may correspond with activity information that is being logged. For example, portions of log information or fingerprint information may be associated with one or more identifiers, such as, timestamps, serial numbers, sequence numbers, GUIDs, or the like, that enable the correspondence of fingerprint information and log information.

In some embodiments, mesh agents may be arranged to forward authenticity tokens to a central log service or the infrastructure security computer for preservation. In some embodiments, infrastructure security computers may be arranged to enable organizations to configure activity logging. In some embodiments, activity logging configurations may include: logging authenticity tokens via the infrastructure security computer, logging authenticity tokens and detailed activity via the infrastructure security computer, logging authenticity tokens via the infrastructure security computer and detailed activity via another logging service. Accordingly, in some embodiments, organizations may configure the infrastructure security engine to store detailed logging activity in a local data store or file system while the authenticity tokens may be stored in data store managed by the infrastructure security engine. In some embodiments, the authenticity tokens may be employed to validate detailed activity logs because the authenticity tokens may include a cryptographic digest of the detailed activity logs. Thus, in some embodiments, the authenticity tokens may be employed to determine if their corresponding detailed activity logs have been tampered with or modified.

At step 720, in one or more of the various embodiments, the ingress agent may receive the server response and forward it to the client.

At this point, additional communication for the client-server session may occur in the established over the overlay network via the secure tunnel. Accordingly, in some embodiments, the secure tunnel may be employed to route traffic between the client and server. As described above, (e.g., step 718) mesh agents that may be participating in the secure tunnel may periodically or occasionally determine if the secure tunnel should remain available. Thus, in some embodiments, the communication may continue until the client-server session may be terminated by the client or server or the until the secure tunnel may be disqualified/disabled by policies provided by the infrastructure security computer.

Figure 8:
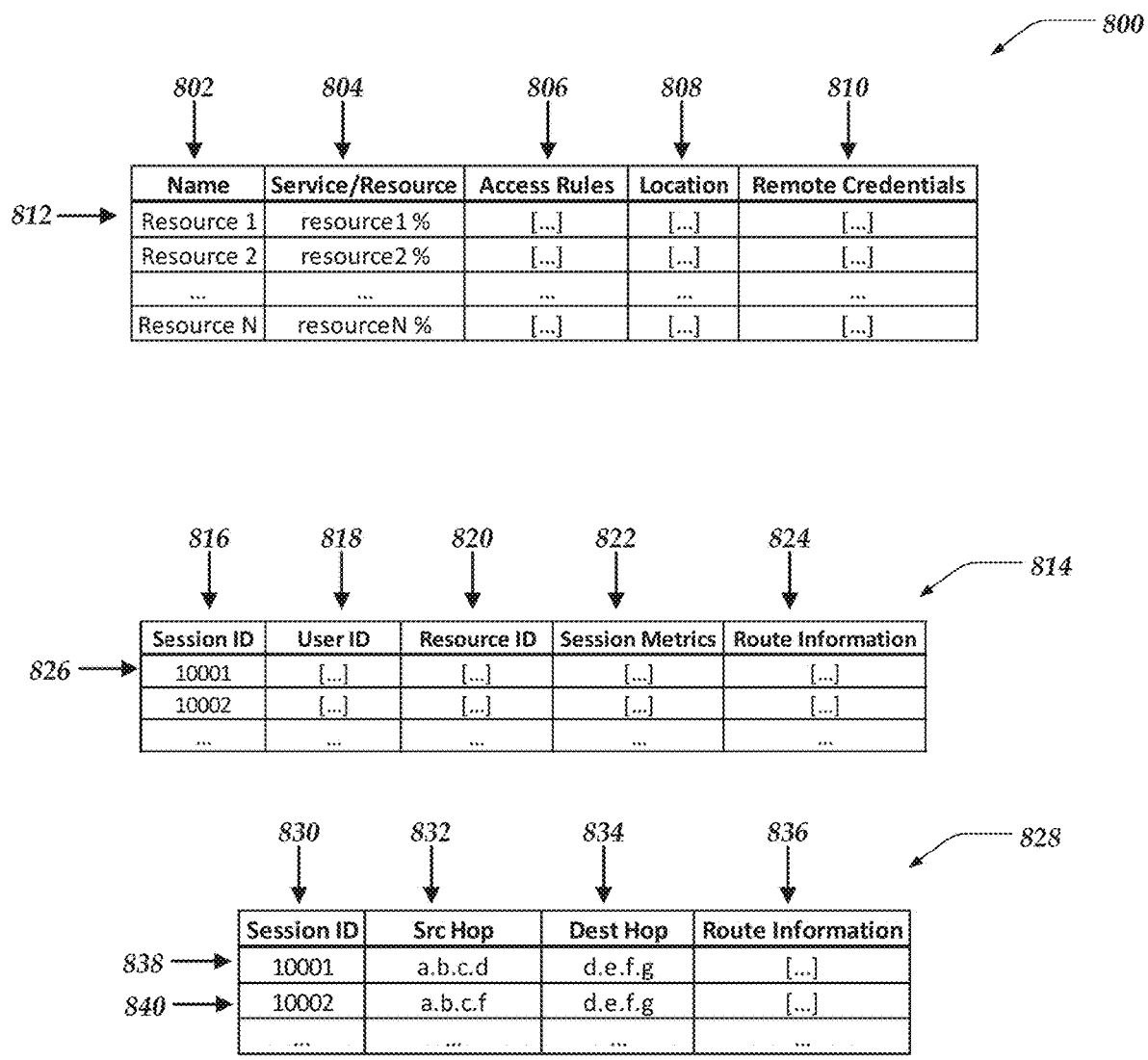
FIG. 8 illustrates logical schematics for data structures for managing and monitoring infrastructure access in networked environments in accordance with one or more of the various embodiments.

FIG. 8 illustrates logical schematics for data structures for managing and monitoring infrastructure access in networked environments in accordance with one or more of the various embodiments. As described above, infrastructure security engine may be arranged to maintain and apply one or more rules, instructions, or the like, that represent the policies for determining if a client may access a resource. Accordingly, in some embodiments, infrastructure security engine may be arranged to employ one or more data structures to manage this type of information. For example, in some embodiments, table 800 may be considered to represent data structures for associating resources with policies for secured networks. In some embodiments, tables, such as, table 800 may include one or more columns, such as: name column 802 for storing a name of a managed resource; service/resource column 804 for storing the actual resource name for executing/identifying the resource on a server; access rules column 806 for storing a collection of one or more rules for determining if a client may access a resource; location column 808 for identifying the location of the server that may be hosting the resource; credentials column 810 for storing the credential information for accessing resources; or the like.

In this example, row 812 may be considered to represent the access rules or other information that an infrastructure security engine may employ to determine if a client may access resource. Also, in this example, row 814 may include location/route information, credential information, one or more metrics associated with a resource (not shown), or the like. One of ordinary skill in the art will appreciate that table 800 may be arranged to include more or less formation or more or fewer metrics associated with a resource without departing from the scope of these disclosed innovations.

Also, in some embodiments, infrastructure security engine may be arranged to maintain one or more data structures for managing current or active secured sessions. In this example, for some embodiments, table 814 may be considered to represent a table for storing records corresponding to active session in a secured network. In some embodiments, tables, such as table 814 may be arranged to include one or more columns, such as: session ID column 816 for storing an identifier for a secure session; user ID column 818 for storing an identifier of the user that may be associated with the secure session; resource ID column 820 for storing an identifier of the resource associated with the secure session; session metrics column 822 for storing one or more metrics, or the like, that may be associated with the secure session; route information column 824 for storing information associated with the network route information for a secure tunnel that may correspond to the secure session. Accordingly, in this example, for some embodiments, row 826 represents a record of information associated with a session in a secure network.

Accordingly, in some embodiments, infrastructure security engines may be arranged to employ information stored in one or more data structures, such as, table 800, to determine one or more of: if a user/client may access a particular resource; the location of the resources in the underlay or overlay network; shared credential information that may be associated with resources; or the like.

Also, in some embodiments, infrastructure security engines may be arranged to employ information stored in one or more data structures, such as, table 814, to determine one or more of: the active secure tunnels; various metrics associated with secure tunnel sessions; route information of established secure tunnels; the users/client/resources that may be associated with a secure tunnel session; or the like. In some embodiments, other information (not shown) may include rules for determining if a secure session should be re-validated or re-authenticated.

In one or more of the various embodiments, one or more portions of table 814 or table 814 may be distributed to mesh agents. In some embodiments, if a mesh agent may be requesting to validate a secure session either to establish a new session or re-validate an existing session, infrastructure security engines may provide the mesh agent one or more data structures that include one or more of the route information, one or more rules for initiating a re-validate operation with the infrastructure security engine, or the like.

As described above, in some embodiments, mesh agents may request route information from infrastructure security engines to determine a next hop in the secured network to use for establishing a secure tunnel. In some embodiments, this information (not shown) may include a list of one or more mesh agents that may be employed as the 'next hop'. In some embodiments, infrastructure security engines may be arranged to preferentially order the list of next hop mesh agents based on one or more route determination rules.

In one or more of the various embodiments, infrastructure security engines may determine preferential next hop mesh agents based on one or more metrics associated with the mesh agents or the network segments associated with the one or more candidate mesh agents. For example, infrastructure security engines may be arranged to evaluate one or more metrics, such as, network congestion, mesh agent utilization, latency, or the like. Further, in some embodiments, prioritization rules may be associated with one or more clients, users, user roles, resources, resource types, or the like, such that one or more mesh agents may be preferred over others. For example, in some embodiments, if the resource may be a streaming video service, their may be one or more routes/mesh agents that may be optimized or otherwise dedicated to streaming video. Accordingly, in this example, infrastructure security engines may be configured to take into account the type of client, the type of resources, or the like, to determine next hop mesh agents.

In one or more of the various embodiments, mesh agents may be arranged to maintain a local collection of information associated with the secure sessions that may be associated with a given mesh agent. Accordingly, in some embodiments, mesh agents may be arranged to employ one or more tables, such as, table 828 for managing session information that may be locally relevant a mesh agent. In some embodiments, tables, such as, table 828 may be arranged to include: session ID column 830 for storing an identifier for the secure sessions associated with a mesh agent; source hop column 832 for storing a network address that may be associated with the previous hop; destination hop column for storing network address information that may be associated with a next hop mesh agent; route information column 836 that may store information associated with the route/secure tunnel as a whole; or the like.

Note, one of ordinary skill in the art will appreciate that table 800, table 814, and table 830, or the like, may provided using various data structures without departing from the scope of the innovations disclosed herein. Also, one of ordinary skill in the art will appreciate that in some embodiments, data structures, such as, table 800, table 814, or table 828 may be arranged to include more or fewer columns/fields, different labels, different column orders, or the like, without departing from the scope of the disclosed innovations.

Also, for brevity and clarity these data structures are represented here using tables, rows, and columns. However, in some embodiments, these or similar information collections may be implemented using data structures other than tables, such as, arrays, lists, objects, or the like, without departing from the scope of the disclosed innovations.

Generalized Operations

FIGS. 9-13 represent generalized operations for managing and monitoring infrastructure access in networked environments in accordance with one or more of the various embodiments. In one or more of the various embodiments, processes 900, 1000, 1100, 1200, and 1300 described in conjunction with FIGS. 9-13 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 9-13 may be used for managing and monitoring infrastructure access in networked environments accordance with at least one of the various embodiments or architectures such as those described in conjunction with FIGS. 1-8 Further, in one or more of the various embodiments, some or all of the actions performed by processes 900, 1000, 1100, 1200, and 1300 may be executed in part by infrastructure security engine 322, one or more mesh agents, such as, mesh agent 324, or the like, running on one or more processors of one or more network computers.

Figure 9:
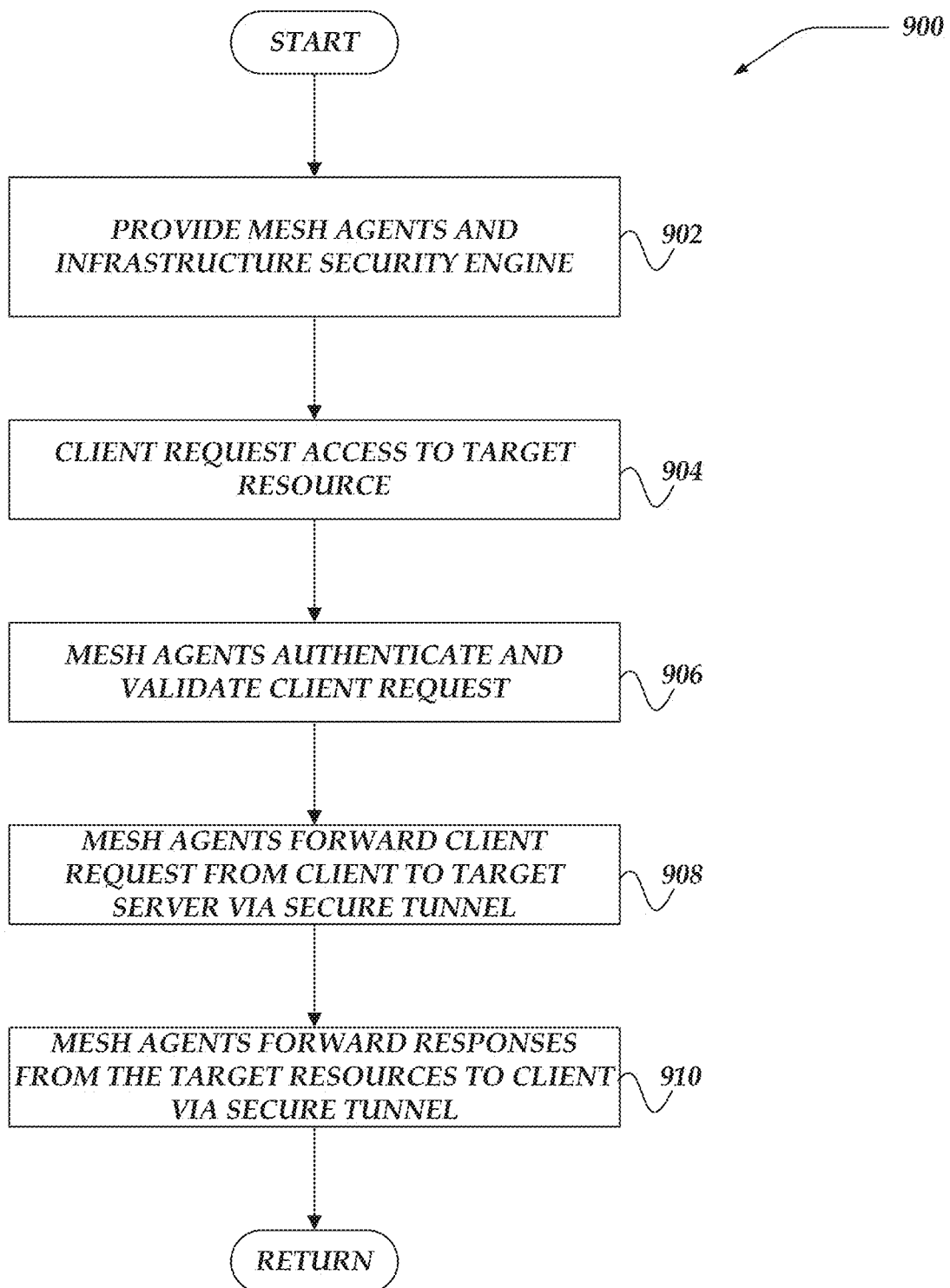
FIG. 9 illustrates an overview flowchart of a process for managing and monitoring infrastructure access in networked environments in accordance with one or more of the various embodiments.

FIG. 9 illustrates an overview flowchart of process 900 for managing and monitoring infrastructure access in networked environments in accordance with one or more of the various embodiments. After a start block, at block 902, in one or more of the various embodiments, one or more mesh agents and one or more infrastructure security engines may be provided. At block 904, in one or more of the various embodiments, mesh agents may be provided a client request to access a target resource. At block 906, in one or more of the various embodiments, mesh agents may be arranged to communicate with one or more infrastructure security engines to authenticate or validate the client requests. At block 908, in one or more of the various embodiments, mesh agents may be arranged to forward validated/authenticated client requests to target resources via a secure tunnel in the overlay network. At block 910, in some embodiments, mesh agents may be arranged to forward responses from the target resource to the client via the secure tunnel. Next, in one or more of the various embodiments, control may be returned to a calling process.

Figure 10:
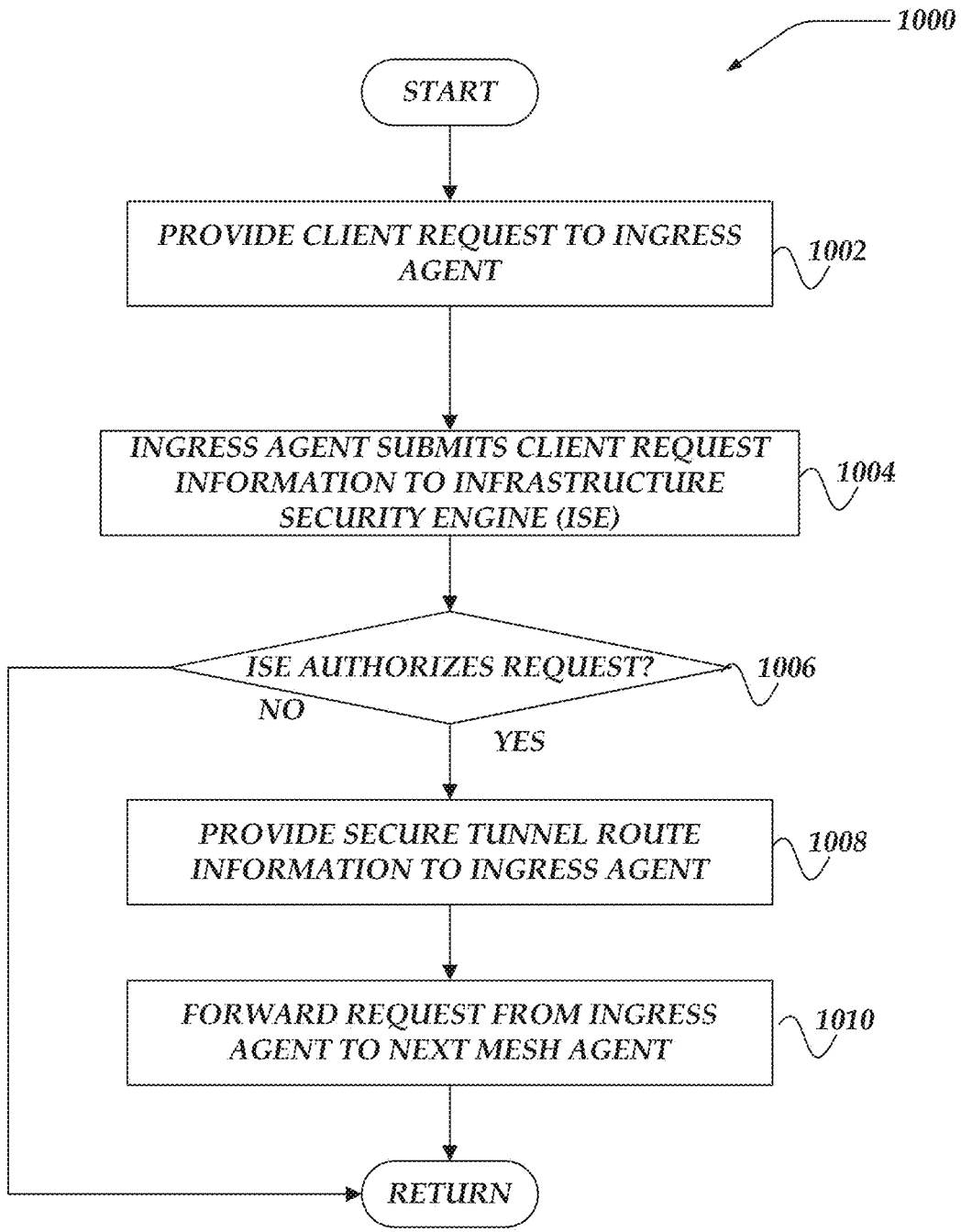
FIG. 10 illustrates a flowchart of a process for managing and monitoring infrastructure access in networked environments in accordance with one or more of the various embodiments.

FIG. 10 illustrates a flowchart of process 1000 for managing and monitoring infrastructure access in networked environments in accordance with one or more of the various embodiments. After a start block, at block 1002, in one or more of the various embodiments, client requests may be provided to an ingress agent. As described above, ingress agents may be mesh agents that a client may employ to access secured resources. In some embodiments, ingress agents may be mesh agents that may be co-located with a client application. In some embodiments, ingress agents may be the closest mesh agent to a client application. For example, in some embodiments, one or more client applications may be configured to for requests to one or more particular mesh agents that may act as ingress agents. In some embodiments, conventional application delivery controllers (e.g., load-balancing devices) may configured to enable client applications to determine the mesh agent to use as an ingress agent.

Further, in some embodiments, the client request may include user identification information, such as, user name, user role, or the like. Also, in some embodiments, the communication between the client application and the ingress agent may be encrypted or otherwise secured based on cryptographic certificates, cryptographic keys, or the like, that may be configured as part of deploying/installing mesh agents, infrastructure security engines, or the like, in the managed network environments.

As described above, in some embodiments, client applications may be configured to route communication to an ingress agent. See, FIG. 6 and associated detailed description.

Also, in some embodiments, ingress agents may be arranged to provide activity information that may be stored in logs to enable to user activity associated with the client request (and subsequent resource responses) to recorded. This information may be employed review (or audit) the activity at later time.

At block 1004, in one or more of the various embodiments, ingress agents may be arranged to submit the client request information to a infrastructure security engine. In one or more of the various embodiments, before beginning to establish a secure tunnel, the ingress agent may forward the client request to a infrastructure security engine. As described above, infrastructure security engines may be hosted on one or more infrastructure security computers that the ingress agent may be configured to access over a network.

At decision block 1006, in one or more of the various embodiments, if the infrastructure security engine authorizes the client request, control may flow to block 1008; otherwise, control may be returned to a calling process.

As described above, infrastructure security engines may be arranged to evaluate one or more rules that may be configured to determine if the user of the client application may access the target resource referenced in the client request.

Accordingly, in some embodiments, infrastructure security engine may be arranged to determine one or more relevant rules based on one or more characteristics of the requesting user, the requesting user's role, the target resource, the client application, or the like. Also, in some embodiments, the network(s) or network addresses associated with the client request or the target resource may determine in part which rule may apply.

In some embodiments, if one or more access rules may be determined, the infrastructure security engine may be arranged to evaluate each rule to determine if the client request may be provided to the target resource. In some embodiments, if at least one rule declines the request, the client request may be rejected, abandoned, or discarded. In some embodiments, infrastructure security engine may be arranged to declare one or more failure/rejection acknowledge messages that may returned to the client. Also, in some embodiments, infrastructure security engines may be arranged to silently reject client requests that may be rejected by the one or more rules.

At block 1008, in one or more of the various embodiments, the infrastructure security engine may be arranged to provide secure tunnel route information to the ingress agent. As described above, in some embodiments, if there may be more than one available mesh agents, infrastructure security engine may determine one or more candidate next hop mesh agents on one or more preference rules. Accordingly, in some embodiments, infrastructure security engines may be arranged to generate a validation message that include session information and the preferentially ordered list of next hop mesh agents that include network address information that may enable the ingress agent to communicate with the one or more mesh agents in the list.

At block 1010, in one or more of the various embodiments, the ingress agent may be arranged to forward the client request to the next hop mesh agent. In one or more of the various embodiments, ingress agents may determine a next hop mesh agent from the list of mesh agents provided by the infrastructure security engines.

Note, in some cases, the next hop mesh agent may be the egress agent associated with the target resource.

Next, in one or more of the various embodiments, control may be returned to a calling process.

Figure 11:
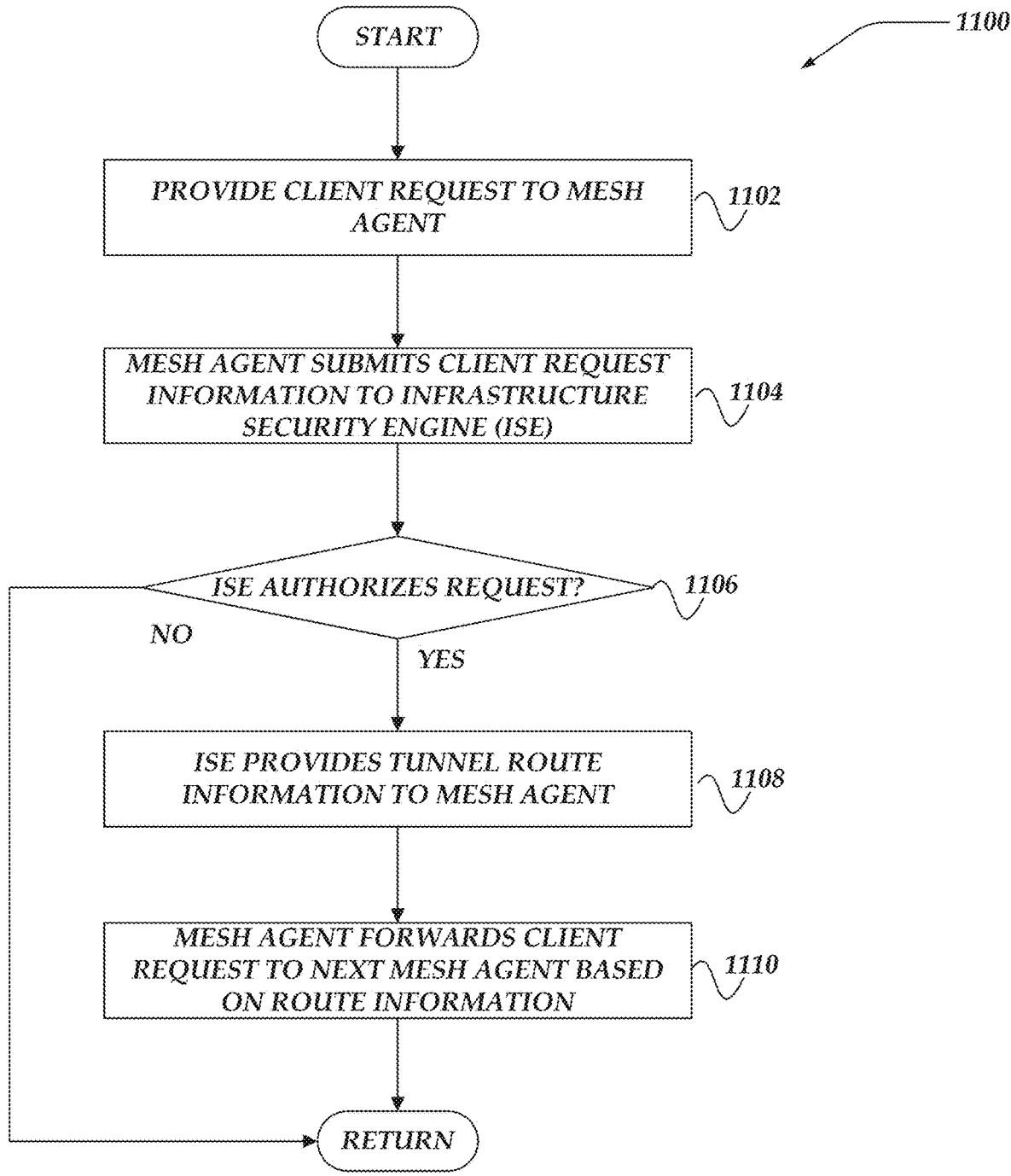
FIG. 11 illustrates a flowchart of a process for managing and monitoring infrastructure access in networked environments in accordance with one or more of the various embodiments.

FIG. 11 illustrates a flowchart of process 1100 for managing and monitoring infrastructure access in networked environments in accordance with one or more of the various embodiments. After a start block, at block 1102, in one or more of the various embodiments, a client request may be provided to a mesh agent. As described above, ingress agents or other mesh agents may forward a client request to a mesh agent. At this point, a secure tunnel may be incomplete, however one or more mesh agents (including the ingress agent) may have validated the request resulting in it being forwarded to the instant mesh agent.

At block 1104, in one or more of the various embodiments, mesh agents may be arranged to submit the client request information to a infrastructure security engine. Similar to the description for block 1004, mesh agent may ask the infrastructure security engine to validate the client request.

At decision block 1106, in one or more of the various embodiments, if the infrastructure security engine authorizes the request, control may flow to block 1108; otherwise, control may be returned to a calling process. As described above, the infrastructure security engine may be arranged to perform one or more operations to validate the client request for the instant mesh agent.

At block 1108, in one or more of the various embodiments, infrastructure security engines may be arranged to provide secure tunnel route information to the mesh agent. As described above, (e.g., detailed description for block 1008, or elsewhere) the infrastructure security engine may provide route information and other session information to the instant mesh agent.

At block 1110, in one or more of the various embodiments, mesh agents may be arranged to forward the client request to the next hop mesh agent based on the route information. As described above, (e.g., detailed description for block 1010, or elsewhere), the instant mesh agent may be arranged to determine the next hop mesh agent and forward the client request information to the determined next hp mesh agent. In some cases, the next hop mesh agent may be the egress agent. In other cases, the next hop mesh agent may another mesh agent on the route to the egress agent.

Next, in one or more of the various embodiments, control may be returned to a calling process.

Figure 12:
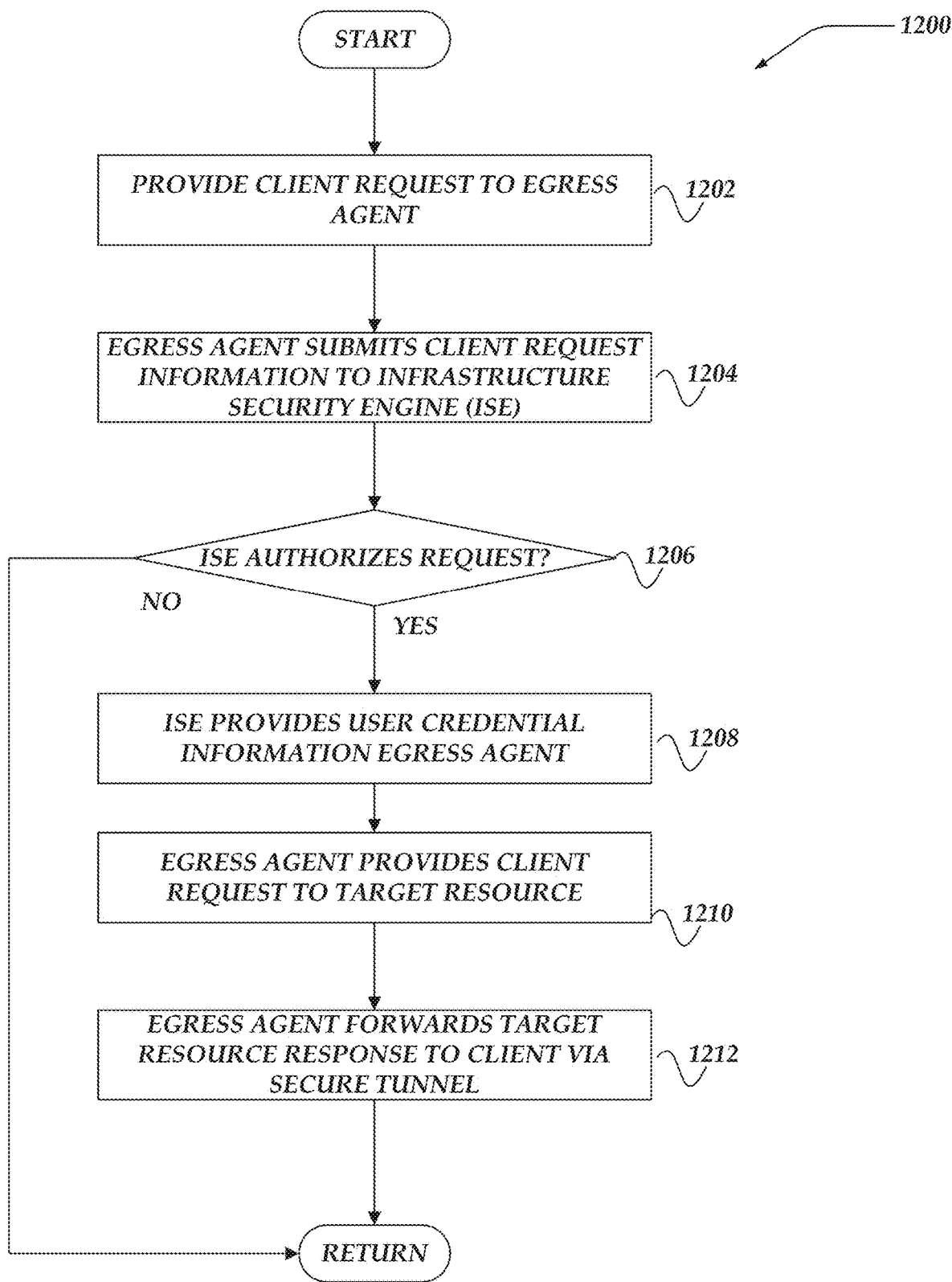
FIG. 12 illustrates a flowchart of a process for managing and monitoring infrastructure access in networked environments in accordance with one or more of the various embodiments.

FIG. 12 illustrates a flowchart of process 1200 for managing and monitoring infrastructure access in networked environments in accordance with one or more of the various embodiments. After a start block, at block 1202, in one or more of the various embodiments, a client request may be provided to an egress agent. As described above, a mesh agent (or ingress agent) may provide the client request information to the egress agent. As described above, for some embodiments, egress agent may be mesh agents that may be co-hosted or otherwise configured to be the last mesh agent in the route between the client and the target resource.

At block 1204, in one or more of the various embodiments, egress agents may be arranged to submit the client request to the infrastructure security engine. As described above, the egress agent may validate the client request with its infrastructure security engine.

At decision block 1206, in one or more of the various embodiments, if the infrastructure security engine authorizes the client request, control may flow to block 1208; otherwise, control may be returned to a calling process. As described above the infrastructure security engine may execute one or more access rules to determine if the client request may be allowed to proceed to the target resource.

At block 1208, in one or more of the various embodiments, infrastructure security engines may be arranged to provide user credential information to the egress agent. In some embodiments, if the infrastructure security engine validates the client request, the infrastructure security engine may determine the user/login credentials for the target resource (if any). In some embodiments, infrastructure security engines may be configured to execute one or more instructions to determine or obtain the required credentials.

At block 1210, in one or more of the various embodiments, egress agents may be arranged to provide the client request to the target resource. Accordingly, in some embodiments, the egress agent may be arranged to employ the provided credentials (if necessary) to provide the client request to the target resource.

In one or more of the various embodiments, if the egress agent may be hosted on the same computer/server as the target resource, the egress agent may directly execute the client request against the target resource such that the request may appear to be local to the target resource. Also, in some cases, for some embodiments, if the egress agent may be configured to access the target resource via the underlay network, the egress agent may employ the underlay (and its supported transport protocols) to forward the client request to the target resource.

At this point, for some embodiments, the secure tunnel may be considered to be established between the client that provided the client requests and the target resource.

At block 1212, in one or more of the various embodiments, egress agents may be arranged to forward responses from the target resource to the client via the secure tunnel. In some embodiments, if the client request causes the target resource to generate a response, the egress agent may be provided the response from the target resource. Accordingly, in some embodiments, the egress agent may forward the response information to the closest next hop mesh agent in the route. In some embodiments, target resource response information may be forwarded back to the ingress agent such that it may be forwarded through intervening mesh agents in that reverse order that they were forwarded the client request.

Next, in one or more of the various embodiments, control may be returned to a calling process.

Figure 13:
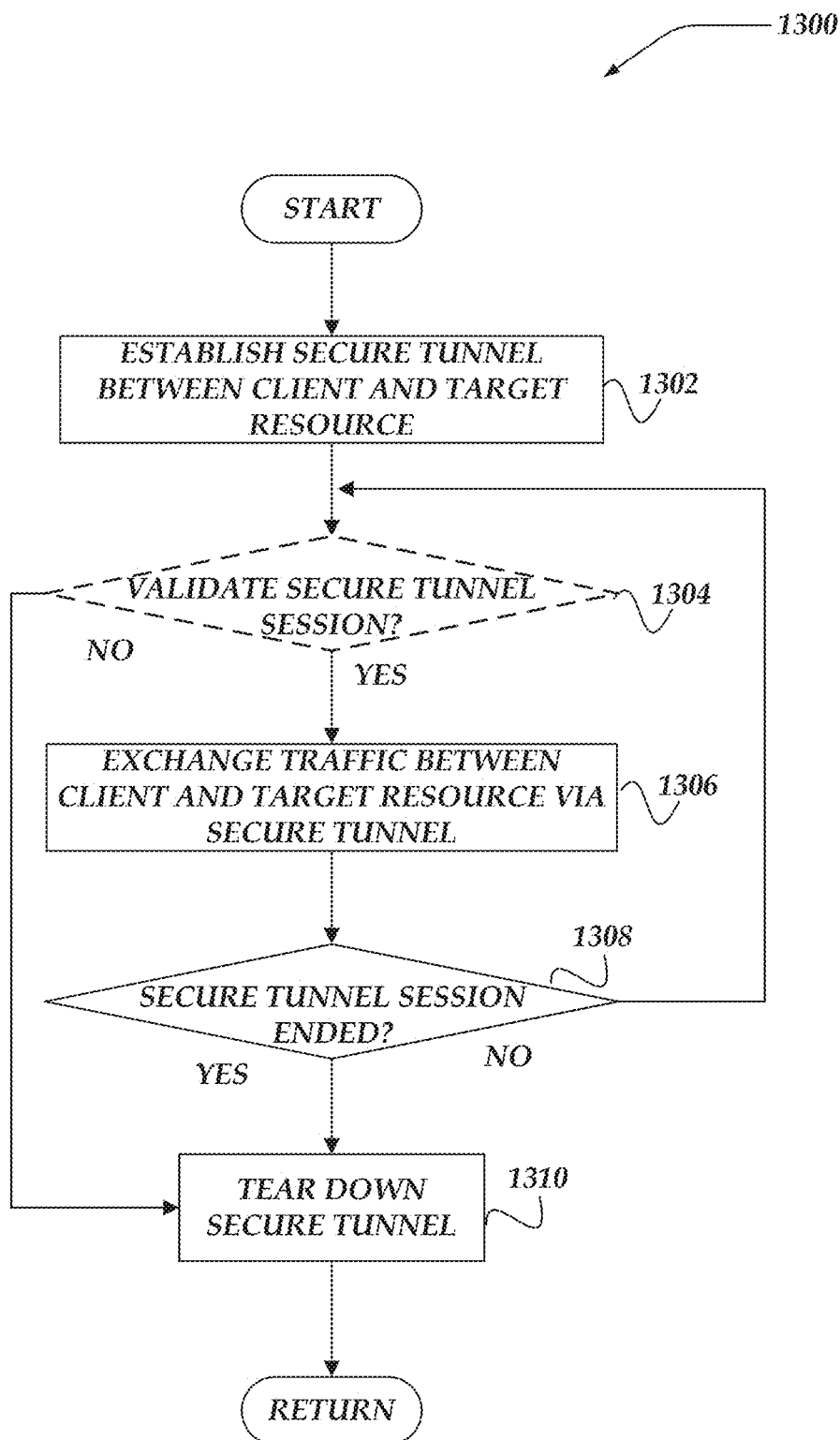
FIG. 13 illustrates a flowchart of a process for managing and monitoring infrastructure access in networked environments in accordance with one or more of the various embodiments.

FIG. 13 illustrates a flowchart of process 1300 for managing and monitoring infrastructure access in networked environments in accordance with one or more of the various embodiments. After a start block, at block 1302, in one or more of the various embodiments, a secure tunnel may be established between the client and target resource. As described above, one or more mesh agents and one or more infrastructure security engines may cooperatively establish a secure tunnel between a client and a target resource.

At decision block 1304, in one or more of the various embodiments, optional, if the secure tunnel session may be validated, control may flow to block 1306; otherwise, control may flow to block 1310. In one or more of the various embodiments, generally, if a secure tunnel may be established, ingress agents, egress agents, or intervening mesh agents may be arranged to trust the secure tunnel for the life of the session. However, in some cases, one or more rules may be established to determine if or how often established secure tunnels may be re-validated with a infrastructure security engine.

In one or more of the various embodiments, rules may include basic time-outs, defined time periods, or the like. However, in some cases, for some embodiments various metrics, such as, duration of session, activity/non-activity of session, one or more performance metrics, or the like, may be considered to determine if an established secure tunnel may be re-validated.

In one or more of the various embodiments, infrastructure security engines may be arranged to enable different re-validation rules for different types of client or types of resources. Likewise, in some embodiments, different network segments, cloud environments, geographic regions, or the like, may be associated with different re-validation rules. For example, in some embodiments, secure tunnels associated with highly utilized resources may be configured to re-validate tunnels if they are idle beyond a define time threshold value. Also, for example, a secure tunnel that may be associated with database resource that stores sensitive data may be configured to be re-validated before responding to each query of the database.

Also, as described above, ingress agents or egress agents may be configured to log information associated with the requests or responses.

Note, this decision block may be optional because one or more rules may bee evaluated to determine if an established secure tunnel may be (re-)validated.

At block 1306, in one or more of the various embodiments, clients and target resources may be enabled to exchange communications via the secure tunnel. In one or more of the various embodiments, mesh agents may be arranged to automatically forward network traffic to or from clients or resources as long as the secure tunnel remains validated or otherwise trusted. Note, in some cases, in some embodiments, communication between clients or resources may be so-called connection-less or stateless such that each communication between the client or resource may be independent such that a new secure tunnel may be established for each communication.

At decision block 1308, in one or more of the various embodiments, if the secure tunnel session may be ended, control may be flow to block 1310; otherwise, control may be loop back to decision block 1304.

At block 1310, in one or more of the various embodiments, infrastructure security engine may be arranged to enable the tear down of the secure tunnel. Accordingly, mesh agents that establish the secure tunnel may be arranged to stop forwarding network traffic from clients or servers that may be associated with the secure tunnel session.

In one or more of the various embodiments, infrastructure security engine may be configured to push messages to shutdown a secure tunnel session. For example, infrastructure security engine may be arranged to provide one or more user interfaces that enable operators to manually indicate if a secure tunnel should be torn down. In some embodiments, infrastructure security engines may be arranged to provide user interfaces that enable operators to shutdown some or all secure tunnels that may be associated with one or more resources. Likewise, in some embodiments, infrastructure security engines may provide user interfaces that enable some or all secure tunnels that may be associated with one or more clients, one or more client types, one or more resource types, one or more network segments, one or more cloud environments, cloud environment regions, or the like.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing access to network resources in a network using one or more processors that are configured to execute instructions, wherein the execution of the instructions enables performance of actions, comprising:
   providing a plurality of mesh agents for an overlay network, wherein each mesh agent is hosted on one or more network computers in the overlay network;
   in response to a request from a client to access a resource on the network, determining a first mesh agent configured to provide the client with ingress to the overlay network;
   in response to a security engine validating the request received from the first mesh agent, determining a route in the overlay network from the client to the resource, wherein each portion of the route corresponds to one or more other mesh agents, and wherein a last mesh agent in the route is enabled to provide access to the resource;
   generating a secure tunnel between the first mesh agent and the last mesh agent based on forwarding the request to one or more mesh agents on the route in the overlay network, wherein the request is validated at each mesh agent in the route by the security engine; and
   in response to providing the request to the last mesh agent, performing further actions, including:
      providing credential information for the resource to the last mesh agent;
      employing the last mesh agent, the request and the credential information to access the resource, wherein the last mesh agent obtains a response to the request from the resource; and
      providing the response to the client via the secure tunnel; and
   in response to the secure tunnel failing a periodic validation, performing further actions, including:
      disabling the client from accessing the resource; and
      discarding the secure tunnel.

2. The method of claim 1, wherein generating the secure tunnel, further comprises:
   providing each mesh agent associated with the route a list of one or more candidate mesh agents that each enable access to a next portion of the route, wherein the list is arranged based on one or more characteristics of the one or more candidate mesh agents;
   determining a next mesh agent in the route based on the list of one or more candidate mesh agents; and
   forwarding the request to the next mesh agent.

3. The method of claim 1, further comprising:
   employing the last mesh agent to generate activity information based on the request and the response from a server;
   generating an authenticity token based on the activity information;
   providing the authenticity token to the security engine; and storing the activity information in one or more data stores that are separate from the security engine.

4. The method of claim 1, wherein validating the request at each mesh agent in the route, further comprises:
employing the request to determine one or more access rules and a user associated with the resource; and
validating the request based on the one or more access rules and the user, wherein the request is forwarded to one of another mesh agent in the route or the resource.

5. The method of claim 1, further comprising:
monitoring one or more performance metrics associated with the plurality of mesh agents; and
modifying the route based on the one or more performance metrics.

6. The method of claim 1, further comprising:
in response to the last mesh agent receiving an error message from the resource, performing further actions, including:
modifying the error message to exclude sensitive information; and
providing the modified error message to the client via the secure tunnel.

7. The method of claim 1, wherein each mesh agent is configurable to operate as an ingress agent or an egress agent.

8. A system for method for managing access to network resources, comprising:
a network computer, comprising:
a memory that stores at least instructions; and
one or more processors that execute instructions that perform actions, including:
providing a plurality of mesh agents for an overlay network, wherein each mesh agent is hosted on one or more network computers in the overlay network;
in response to a request from a client to access a resource on the network, determining a first mesh agent configured to provide the client with ingress to the overlay network;
in response to a security engine validating the request received from the first mesh agent, determining a route in the overlay network from the client to the resource, wherein each portion of the route corresponds to one or more other mesh agents, and wherein a last mesh agent in the route is enabled to provide access to the resource;
generating a secure tunnel between the first mesh agent and the last mesh agent based on forwarding the request to one or more mesh agents on the route in the overlay network, wherein the request is validated at each mesh agent in the route by the security engine; and
in response to providing the request to the last mesh agent, performing further actions, including:
providing credential information for the resource to the last mesh agent;
employing the last mesh agent, the request and the credential information to access the resource, wherein the last mesh agent obtains a response to the request from the resource; and
providing the response to the client via the secure tunnel; and
in response to the secure tunnel failing a periodic validation, performing further actions, including:
disabling the client from accessing the resource; and
discarding the secure tunnel; and a client computer, comprising:
a memory that stores at least instructions; and
one or more processors that execute instructions that enable performance of actions, including:
providing the request.

9. The system of claim 8, wherein generating the secure tunnel, further comprises:
providing each mesh agent associated with the route a list of one or more candidate mesh agents that each enable access to a next portion of the route, wherein the list is arranged based on one or more characteristics of the one or more candidate mesh agents;
determining a next mesh agent in the route based on the list of one or more candidate mesh agents; and
forwarding the request to the next mesh agent.

10. The system of claim 8, wherein the one or more network computer processors execute instructions that perform further actions comprising:
employing the last mesh agent to generate activity information based on the request and the response from a server;
generating an authenticity token based on the activity information;
providing the authenticity token to the security engine; and
storing the activity information in one or more data stores that are separate from the security engine.

11. The system of claim 8, wherein validating the request at each mesh agent in the route, further comprises:
employing the request to determine one or more access rules and a user associated with the resource; and
validating the request based on the one or more access rules and the user, wherein the request is forwarded to one of another mesh agent in the route or the resource.

12. The system of claim 8, wherein the one or more network computer processors execute instructions that perform further actions comprising:
monitoring one or more performance metrics associated with the plurality of mesh agents; and
modifying the route based on the one or more performance metrics.

13. The system of claim 8, wherein the one or more network computer processors execute instructions that perform further actions comprising:
in response to the last mesh agent receiving an error message from the resource, performing further actions, including:
modifying the error message to exclude sensitive information; and
providing the modified error message to the client via the secure tunnel.

14. The system of claim 8, wherein each mesh agent is configurable to operate as an ingress agent or an egress agent.

15. A processor readable non-transitory storage media that includes instructions for managing access to network resources over a network, wherein execution of the instructions by one or more processors on one or more network computers enables performance of actions, comprising:
providing a plurality of mesh agents for an overlay network, wherein each mesh agent is hosted on one or more network computers in the overlay network;
in response to a request from a client to access a resource on the network, determining a first mesh agent configured to provide the client with ingress to the overlay network;

in response to a security engine validating the request received from the first mesh agent, determining a route in the overlay network from the client to the resource, wherein each portion of the route corresponds to one or more other mesh agents, and wherein a last mesh agent in the route is enabled to provide access to the resource;

generating a secure tunnel between the first mesh agent and the last mesh agent based on forwarding the request to one or more mesh agents on the route in the overlay network, wherein the request is validated at each mesh agent in the route by the security engine; and in response to providing the request to the last mesh agent, performing further actions, including:
  providing credential information for the resource to the last mesh agent;
  employing the last mesh agent, the request and the credential information to access the resource, wherein the last mesh agent obtains a response to the request from the resource; and
  providing the response to the client via the secure tunnel; and in response to the secure tunnel failing a periodic validation, performing further actions, including:
  disabling the client from accessing the resource; and
  discarding the secure tunnel.

16. The media of claim 15, wherein generating the secure tunnel, further comprises:
  providing each mesh agent associated with the route a list of one or more candidate mesh agents that each enable access to a next portion of the route, wherein the list is arranged based on one or more characteristics of the one or more candidate mesh agents;
  determining a next mesh agent in the route based on the list of one or more candidate mesh agents; and
  forwarding the request to the next mesh agent.

17. The media of claim 15, further comprising:
  employing the last mesh agent to generate activity information based on the request and the response from a server;
  generating an authenticity token based on the activity information;
  providing the authenticity token to the security engine; and
  storing the activity information in one or more data stores that are separate from the security engine.

18. The media of claim 15, wherein validating the request at each mesh agent in the route, further comprises:
  employing the request to determine one or more access rules and a user associated with the resource; and
  validating the request based on the one or more access rules and the user, wherein the request is forwarded to one of another mesh agent in the route or the resource.

19. The media of claim 15, further comprising:
  monitoring one or more performance metrics associated with the plurality of mesh agents; and
  modifying the route based on the one or more performance metrics.

20. The media of claim 15, further comprising:
  in response to the last mesh agent receiving an error message from the resource, performing further actions, including:
    modifying the error message to exclude sensitive information; and
    providing the modified error message to the client via the secure tunnel.

21. A network computer for managing access to network resources, comprising:
  a memory that stores at least instructions; and
  one or more processors that execute instructions that enable performance of actions, including:
    providing a plurality of mesh agents for an overlay network, wherein each mesh agent is hosted on one or more network computers in the overlay network;
    in response to a request from a client to access a resource on the network, determining a first mesh agent configured to provide the client with ingress to the overlay network;
    in response to a security engine validating the request received from the first mesh agent, determining a route in the overlay network from the client to the resource, wherein each portion of the route corresponds to one or more other mesh agents, and wherein a last mesh agent in the route is enabled to provide access to the resource;
    generating a secure tunnel between the first mesh agent and the last mesh agent based on forwarding the request to one or more mesh agents on the route in the overlay network, wherein the request is validated at each mesh agent in the route by the security engine; and
    in response to providing the request to the last mesh agent, performing further actions, including:
      providing credential information for the resource to the last mesh agent;
      employing the last mesh agent, the request and the credential information to access the resource, wherein the last mesh agent obtains a response to the request from the resource; and
      providing the response to the client via the secure tunnel; and
    in response to the secure tunnel failing a periodic validation, performing further actions, including:
      disabling the client from accessing the resource; and
      discarding the secure tunnel.

22. The network computer of claim 21, wherein generating the secure tunnel, further comprises:
  providing each mesh agent associated with the route a list of one or more candidate mesh agents that each enable access to a next portion of the route, wherein the list is arranged based on one or more characteristics of the one or more candidate mesh agents;
  determining a next mesh agent in the route based on the list of one or more candidate mesh agents; and
  forwarding the request to the next mesh agent.

23. The network computer of claim 21, wherein the one or more processors execute instructions that perform actions, further comprising:
  employing the last mesh agent to generate activity information based on the request and the response from a server;
  generating an authenticity token based on the activity information;
  providing the authenticity token to the security engine; and
  storing the activity information in one or more data stores that are separate from the security engine.

24. The network computer of claim 21, wherein validating the request at each mesh agent in the route, further comprises:
  employing the request to determine one or more access rules and a user associated with the resource; and
  validating the request based on the one or more access rules and the user, wherein the request is forwarded to one of another mesh agent in the route or the resource.

25. The network computer of claim 21, wherein the one or more processors execute instructions that perform actions, further comprising:
  monitoring one or more performance metrics associated with the plurality of mesh agents; and
  modifying the route based on the one or more performance metrics.

26. The network computer of claim 21, wherein the one or more processors execute instructions that perform actions, further comprising:
  in response to the last mesh agent receiving an error message from the resource, performing further actions, including:
    modifying the error message to exclude sensitive information; and
    providing the modified error message to the client via the secure tunnel.

* * * * *